Nov. 29, 1955  S. AUSTIN  2,725,019
BREAD DOUGH MOULDER
Filed April 30, 1954  2 Sheets-Sheet 1
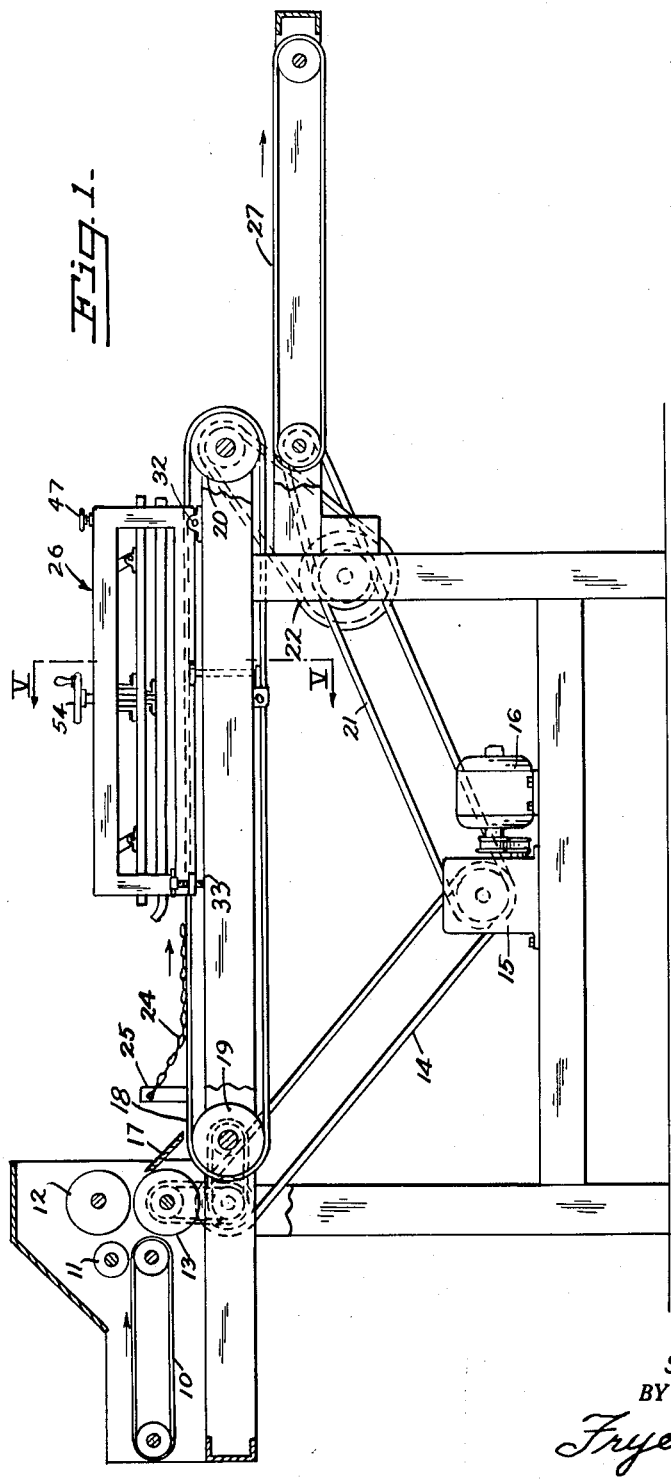
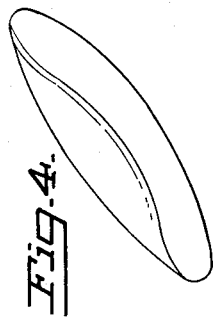
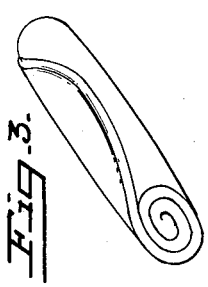
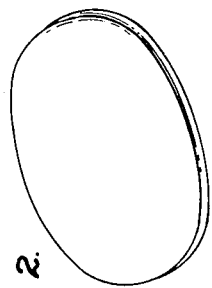
INVENTOR.
SAMUEL AUSTIN
BY
Fryer and Johnson
ATTORNEYS Nov. 29, 1955 S. AUSTIN 2,725,019
BREAD DOUGH MOULDER
Filed April 30, 1954 2 Sheets-Sheet 2
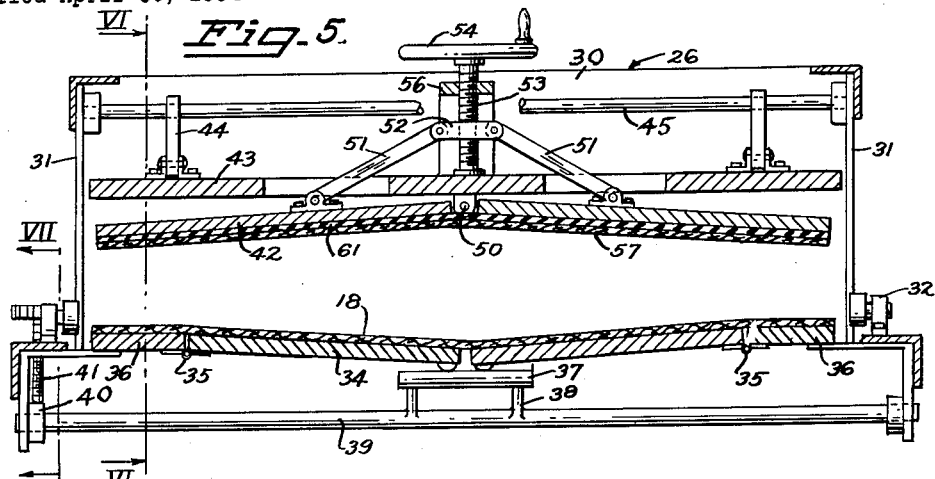
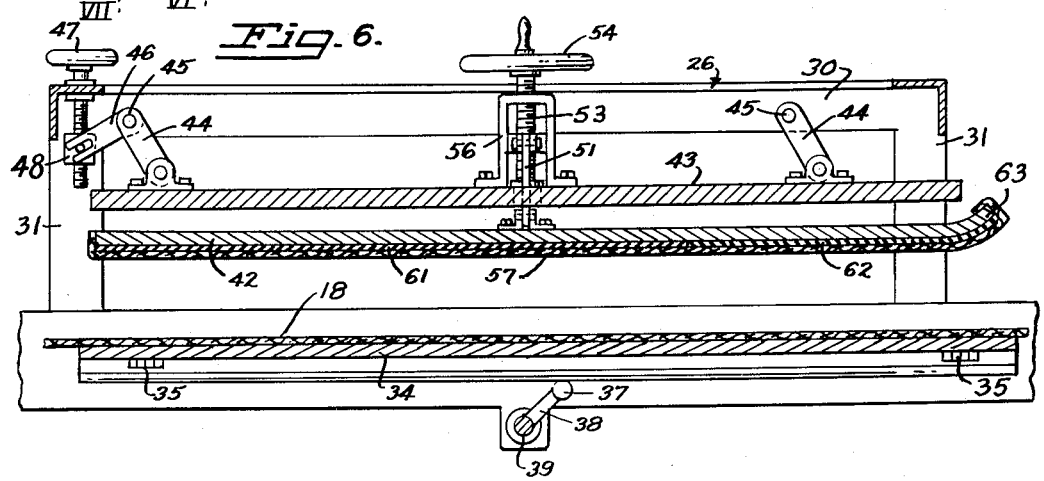
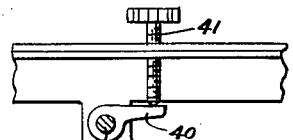
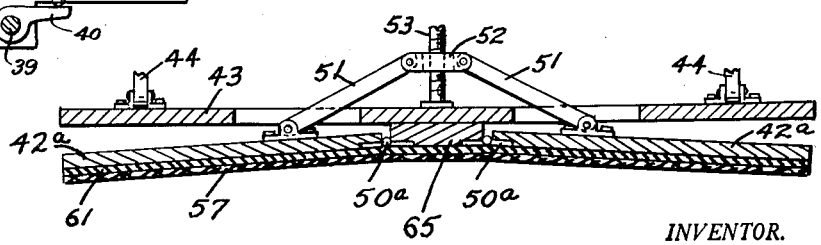
INVENTOR.
SAMUEL AUSTIN
BY
Fryer and Johnson
ATTORNEYS

United States Patent Office 2,725,019
Patented Nov. 29, 1955

2,725,019

BREAD DOUGH MOULDER

Samuel Austin, Hartford, Conn., assignor to Joseph Rosenthal, Hartford, Conn.

Application April 30, 1954, Serial No. 426,840

3 Claims. (Cl. 107—9)

This invention relates to dough moulders and particularly to machines for shaping or moulding uncooked baker's dough into bread loaves.

The purpose of a bread dough moulder is to receive an irregular piece of dough and shape it into one of the regular loaf forms known in the trade as "Vienna," "French" of "Italian" and characterized by their long oval shape tapering toward the ends.

Presently known dough moulders include a sheeter for flattening a lump of dough, a curler for rolling the flat piece into a somewhat cylindrical shape and a moulder for imparting the final tapered contour thereto. The moulder portion of the machine usually includes an endless belt conveyor made of canvas for carrying the partially formed loaf under a pressure board. The pressure board is convex and canvas covered so that as the dough is carried under the pressure board it is rolled and pressed against the concave board to impart the final shape required.

Loaves are required in various shapes and sizes and currently used machines employ a plurality of interchangeable pressure boards for producing different types of loaves.

It is important in the moulding of dough to avoid shocking or sudden hard pressures which deprive it of its proper tendency to rise in baking and result in what is referred to in the trade as "dead dough." It is preferable that the treatment of the dough be similar in action to that of the human hand and characterized by resilient moulding pressures rather than by the more positive shaping of non-resilient mechanical parts.

It is an object of the present invention to provide a bread dough moulder of the kind described in which the pressure board is adjustable so that it need not be interchanged for producing different loaves and may be slightly adjusted for producing precise results with any type of loaf.

Another object of the invention is to provide a moulder which has a moulding table beneath the conveyor belt also adjustable as to concavity so that it cooperates with the pressure board to assist in the production of the desired shape of loaf.

A still further object of the invention is the provision of means to impart gradually increasing resilient pressure to dough, during the moulding thereof into a loaf, to minimize the possibility of deadening the dough during the process.

Further and more specific objects and advantages of the invention are made apparent in the following specification wherein reference is made to the accompanying drawings illustrating means for carrying the invention into practice.

In the drawings:

Fig. 1 is a view in side elevation with the parts in section of a bread dough moulder embodying the present invention;

Fig. 2 is an illustration of a piece of dough after it has been passed through the sheeter of such a machine;

Fig. 3 illustrates the same piece of dough after it has been passed through the curler;

Fig. 4 illustrates the dough shaped into loaf form by the moulding portion of the machine;

Fig. 5 is a vertical transverse section taken on the line V—V of Fig. 1;

Fig. 6 is a sectional view taken on the line VI—VI of Fig. 5;

Fig. 7 is a detail view taken on the line VII—VII of Fig. 5; and

Fig. 8 is a fragmentary section of parts shown in Fig. 5 illustrating a modified form of the invention.

As viewed in Fig. 1, the machine of the present invention includes a sheeter to receive an unshaped lump of dough and roll it into a flat form somewhat as indicated in Fig. 2. This sheeter includes a feed belt 10 upon which the lump of dough is placed in a central position to feed it under a preliminary roller 11 and a pair of finishing rollers 12 and 13. The feed belt and rollers are driven in a suitable manner as through a main chain or belt 14 from a reduction gear housing 15 powered by an electric motor 16 disposed in the lower portion of the frame which supports the machine.

A scraper 17 bearing against the roller 13 insures the delivery of the sheeted dough to a main conveyor belt 18. The conveyor belt 18 which is of canvas-like material is trained over rollers 19 and 20, the latter of which is driven as through suitable chains or belts such as indicated at 21 and 22 connecting it with the reduction gear housing 15. The top flight of the belt 18 advances from left to right as viewed in Fig. 1 and adjacent the end where the sheeted dough is deposited on the belt, a metal link or chain curtain shown at 24 is supported to drag on the belt, one end of the chain curtain being supported on a rod between posts 25 arranged at opposite sides of the belt. This chain curtain, known in the trade as a curler, serves the purpose of causing the flat sheeted dough to be rolled into a somewhat cylindrical form such as illustrated in Fig. 3.

The moulding portion of the machine to which the present invention is directed is generally indicated at 26 in Fig. 1 and as the dough is carried therethrough by the belt 18, the tapered loaf shape is imparted to it so that it appears as illustrated in Fig. 4. Upon leaving the moulder, the loaves are deposited on a delivery belt 27 from which they are removed by hand and placed in a suitable pan or baking tray.

Since the sheeter, curler and delivery belt herein disclosed are of conventional form, a further and more detailed description of these parts is unnecessary. However the details of construction of the moulder 26 will be described by reference to Figs. 5, 6 and 7. In these figures, the moulder is illustrated as a rectangular frame having a top portion 30 and side portions 31. This frame is secured at one end as by hinges 32 to the main frame of the machine and at its opposite end are adjustable pins shown at 33 in Fig. 1 which rest on the main frame making it possible to raise or lower the forward end of the moulder frame with respect to the conveyor belt 18 for reasons presently to be described. The conveyor belt 18 passes through the moulder frame and is supported by a moulding table 34 disposed beneath it and adjustable to permit the belt 18 to assume a concave form as best illustrated in Fig. 5. To accomplish this, the moulding table has two principal parts connected as by hinges 35 with rigid boards 36 suitably supported from the main frame of the machine. This enables the table parts 34 to swing downwardly a distance limited by a stop bar 37 supported on pins 38 projecting from a shaft 39. This shaft 39 is supported for rocking movemen and adjacent one end carries a lever 40 best shown in Fig. 7 which bears upwardly against a threaded pin 41 with a hand wheel at its upper end. This makes it possible to adjust the depth of concavity of the moulding table.

A pressure board illustrated at 42 is disposed directly above the moulding table and is also oppositely and adjustably concaved. This pressure board is supported for adjustment to and away from the moulding table by means of its connection with an adjustable platform 43. This platform is carried on a set of four parallel links 44 depending two each from a pair of shafts 45 which extend transversely of the moulder frame. The links 44 at the left as viewed in Fig. 6 are secured to their shaft 45 and also secured to the shaft is a slotted lever 46. An adjusting screw 47 carries a nut 48 with a pin projecting into the slot of one of the levers 46 so that adjustment of this screw effects rocking of the shaft 45 and thus raises and lowers the platform 43 about its parallel link support. This adjustment is desirable for making loaves of different sizes.

The pressure board 42 is made of two parts, centrally hinged as indicated at 50 to the supporting platform, and the two parts are connected by links 51 with a threaded collar 52 on an adjusting screw 53 which has a hand wheel 54 at its upper end. This adjusting screw 53 is supported in a suitable bracket 56 fixed to the platform 43 so that upon rotation the collar 52 may be raised and lowered and through the links 51 modify the angularity of the pressure board. The pressure board is also covered with canvas as shown at 57 and since the board remains stationery while the belt 18 advances, the dough passing through the moulder is rolled and tapered toward its ends to a degree depending upon the adjustment of the moulding table and pressure board. The length of the loaves so formed as well as the thickness may be regulated by raising and lowering the platform 43 to adjust the spacing between the pressure board and moulding table.

It is desirable as previously pointed out that the moulding of the dough be accomplished with gentle and gradual pressures and to this end a soft resilient material such as sponge rubber or the like, shown at 61, is placed between the canvas 57 and the pressure board 42. The forward portion of the pressure board is preferably provided with a softer material throughout approximately a third of the length of the board, this material being illustrated at 62 in Fig. 6 so that the moulding pressure applied to the dough is gradual. The very forward edge of the pressure board is curved or inclined upwardly as indicated at 63 thus further preventing shock as the dough enters beneath it. An additional means for imparting moulding pressure gradually and progressively is afforded by the adjusting screws shown at 33 in Fig. 1 which enable the entire moulding frame to be raised slightly at its forward end so that the space between the moulding table and pressure board gradually decreases as the moulding operation progresses.

A modification in the structure of the pressure board is shown in Fig. 8. In this modification, two pressure board parts 42a are connected to a central part 65 rigidly secured to the platform 43. Two sets of hinges 50a take the place of hinges 50 shown in Fig. 5. The result of this structure is a more gradual curvature of the concavity of the pressure board. The reference characters otherwise shown in Fig. 8 refer to the same parts with the same functions as those shown in Fig. 5.

The construction herein described has many advantages, one being that both the moulding table and pressure board are adjustably concaved and adjustable with respect to each other so that loaves of different sizes and shapes may be made without changing boards and very slight variations in loaf shape may be obtained through the adjustments provided. Furthermore the handling of the dough is improved by the cushioning on the pressure board as well as the inclination which may be given to the pressure board to effect a gradual shaping of the loaf.

1. A bread dough moulder which comprises a stationary frame, a moulding table on said frame, a moveable belt overlying said table for carrying a piece of dough thereover, a moulding board overlying the table and belt to aid in imparting a loaf shape to the dough, a second frame supporting the moulding board, a horizontally pivoted hinged connection between the board supporting frame and the table supporting frame adjacent their dough discharge ends, and an adjustable connection adjacent the intake ends of said frames to provide an adjustable gradually reduced space between the board and the table.

2. A bread dough moulder which comprises a stationary frame, a moulding table on said frame, a moveable belt overlying said table for carrying a piece of dough thereover, a moulding board overlying the table and belt to aid in imparting a loaf shape to the dough, a second frame supporting the moulding board, a horizontally pivoted hinged connection between the board supporting frame and the table supporting frame adjacent their dough discharge ends, an adjustable connection adjacent the intake ends of said frames to provide an adjustable gradually reduced space between the board and the table, a covering of resilient material on the major portion of the moulding board, and a covering of more highly resilient material of the same thickness adjacent the intake end of the board.

3. In a bread dough moulder of the kind described which includes a belt for carrying dough between a moulding board disposed above the belt and a moulding table disposed beneath the belt, a frame for supporting the moulding table, a frame for supporting the moulding board, a horizontally pivoted hinged support between the discharge ends of said frames, and a vertically adjustable connection between the opposite ends of said frames to provide an adjustably tapered moulding space between the board and table.

References Cited in the file of this patent
UNITED STATES PATENTS

| Number | Name | Date |
|---|---|---|
| 889,465 | Keller et al. | June 2, 1908 |
| 1,537,018 | Lauterbur | May 5, 1925 |
| 1,537,613 | Lauterbur | May 12, 1925 |
| 1,642,693 | Parsons | Sept. 20, 1927 |
| 2,082,753 | Parsons et al. | June 1, 1937 |
| 2,327,245 | Bridge | Aug. 17, 1943 |
| 2,461,868 | Baird | Feb. 15, 1949 |